United States Patent
Naoi

(10) Patent No.: US 8,801,082 B2
(45) Date of Patent: Aug. 12, 2014

(54) VEHICLE BODY FRONT PART STRUCTURE

(75) Inventor: Daisuke Naoi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/704,727

(22) PCT Filed: May 23, 2011

(86) PCT No.: PCT/JP2011/061765
§ 371 (c)(1),
(2), (4) Date: Dec. 17, 2012

(87) PCT Pub. No.: WO2011/162060
PCT Pub. Date: Dec. 29, 2011

(65) Prior Publication Data
US 2013/0093216 A1    Apr. 18, 2013

(30) Foreign Application Priority Data

Jun. 24, 2010  (JP) .................... 2010-143870

(51) Int. Cl.
*B62D 25/08* (2006.01)
*B62D 25/14* (2006.01)

(52) U.S. Cl.
CPC ............. *B62D 25/08* (2013.01); *B62D 25/14* (2013.01)
USPC ....................... 296/187.09; 296/70

(58) Field of Classification Search
USPC ............. 296/187.09, 193.09, 70, 72, 193.07, 296/39.3
See application file for complete search history.

(56) References Cited

U.S. PATENT DOCUMENTS

| | | | |
|---|---|---|---|
| 6,926,352 B2 * | 8/2005 | Gotou et al. | 296/204 |
| 2006/0119140 A1 | 6/2006 | Yamazaki | |
| 2009/0066116 A1 * | 3/2009 | Kuroita et al. | 296/193.09 |
| 2010/0109370 A1 * | 5/2010 | Yamada | 296/70 |

FOREIGN PATENT DOCUMENTS

| | | |
|---|---|---|
| EP | 0908371 A2 | 4/1999 |
| JP | 60-117224 | 8/1985 |
| JP | 62-97885 | 6/1987 |
| JP | 4-28178 | 3/1992 |
| JP | 4-297382 | 10/1992 |
| JP | 07-040372 U | 7/1995 |
| JP | 2531718 U | 4/1997 |
| JP | 2006-96091 | 4/2006 |

(Continued)

OTHER PUBLICATIONS

International Search Report dated Aug. 4, 2011.
Japanese Notice of Allowance with English Translation, Application No. 2012-521381, Dated Jul. 30, 2013, 6 pages.

(Continued)

*Primary Examiner* — Joseph Pape
*Assistant Examiner* — Dana Ivey
(74) *Attorney, Agent, or Firm* — Rankin, Hill & Clark LLP

(57) ABSTRACT

A vehicle body front part structure according to a first aspect of the present invention includes: a center frame which extends along a vertical direction of a vehicle, a top end flange part that bends toward a rear being formed on a top end of the center frame; and a dashboard lower which has a first vertical wall, a bent part that is bent toward the rear being formed on a top edge of the first vertical wall. The top end flange part and the bent part are joined overlapping each other, and a closed cross-section structure part is formed between the center frame and the bent part.

10 Claims, 7 Drawing Sheets

(56) References Cited

FOREIGN PATENT DOCUMENTS

| | | |
|---|---|---|
| JP | 2009-73305 | 4/2009 |
| JP | 4348983 | 7/2009 |
| WO | 2011/027431 A1 | 3/2011 |

OTHER PUBLICATIONS

European Search Report, Application No. 11797947.6, dated Oct. 15, 2013, 3 pages.

\* cited by examiner

VEHICLE BODY FRONT PART STRUCTURE

TECHNICAL FIELD

This invention relates to a vehicle body front part structure. Priority is claimed on Japanese Patent Application No. 2010-143870, filed Jun. 24, 2010, the contents of which are incorporated herein by reference.

BACKGROUND ART

In general, a vehicle body has a cabin (compartment) where passengers ride, an engine compartment, which is arranged at the front of this cabin and houses an engine and the like, and a floor part provided underneath the cabin. Furthermore, a pair of hinge pillars is provided in the two corners of the front part of the cabin in the vehicle width direction, so as to extend in the vertical direction, which support the side doors via hinges, and a cowl with a closed cross-section structure extending in the vehicle width direction spans the top parts of the two hinge pillars. Moreover, a dashboard is provided in the area enclosed by the floor part, the pair of hinge pillars, and the cowl, which separates the engine compartment from the cabin.

Since the dashboard is a part that only separates the engine compartment from the cabin, in many cases it is formed from thin sheet for lightness. As a result, there is a possibility that the dashboard membrane vibrates when moving. Therefore, in order to suppress the membrane vibration, a stiffening member extending in the vertical direction is provided in the dashboard. This can increase the stiffness of the dashboard.

The stiffening member is formed with a U-shaped cross-section, which is open on the dashboard side, and forms a closed cross-section by flanges provided on the open side ends being joined to the dashboard. Furthermore, the top end of the stiffening member extends to the cowl, and is joined to the bottom surface of this cowl (for example, refer to Patent Document 1).

PRIOR ART DOCUMENT

Patent Document

[Patent Document 1] Japanese Patent Publication No. 4348983

SUMMARY OF THE INVENTION

Problem to be Solved by the Invention

However, in the above-described conventional technique, since a stiffening member is joined to the bottom surface of the cowl, the bottom surface of the cowl is deformed, so that there is a possibility that the dashboard membrane vibrates with the top end of the dashboard being the start point. Therefore, there is a problem in that even if the stiffness of the dashboard is increased using the stiffening member, it is difficult to suppress the membrane vibration effectively.

Consequently, this invention has been made in consideration of the above situation, with an object of providing a vehicle body front part structure that can suppress the vibration of a dashboard membrane effectively.

Means for Solving the Problem

The present invention employs the following measures in order to solve the above-described problem and achieve the associated object.

That is, (1) a vehicle body front part structure according to a first aspect of the present invention includes: a center frame which extends along a vertical direction of a vehicle, a top end flange part that bends toward a rear being formed on a top end of the center frame; and a dashboard lower which has a first vertical wall, a bent part that is bent toward the rear being formed on a top edge of the first vertical wall. The top end flange part and the bent part are joined overlapping each other, and a closed cross-section structure part is formed between the center frame and the bent part.

(2) The vehicle body front part structure according to the above-described (1) may further include a front glass support panel having a second vertical wall that is formed on a same plane as the first vertical wall; and the second vertical wall of the front glass support panel is joined to the bent part of the dashboard lower.

(3) In the vehicle body front part structure according to the above-described (1), a bottom end flange part may be formed at a bottom end of the center frame; a tunnel part may be provided in a center of a bottom of the dashboard lower in a width direction of the vehicle; and the bottom end flange parts may be joined to the tunnel part.

(4) In the vehicle body front part structure according to the above-described (3), a vehicle body front part structure may further include a dashboard cross member which is provided with the dashboard lower and extends along the vehicle width direction. The dashboard cross member and the center frame may be joined.

(5) In the vehicle body front part structure according to the above-described (3), the center frame may have a pair of walls facing each other and a bottom wall which joins bottom ends of the pair of side walls to each other, and may be disposed in a descending slope toward the rear; and a ridge of the center frame, which is a connecting portion of the side walls and the bottom wall, may be formed in a straight line.

Effects of the Invention

According to the vehicle body front part structure in the above-described (1), since a closed cross-section structure part is formed between the bent part which is a start point of membrane vibration of the first vertical wall of the dashboard lower, and the center frame, it is possible to increase the stiffness of the bent part. As a result, it is possible to suppress the vibration of the dashboard lower membrane effectively.

According to the vehicle body front part structure according to the above-described (2), by making use of a second vertical wall of the front glass panel having a high stiffness, it is possible to further increase the stiffness of the bent part. As a result, it is possible to suppress the vibration of the dashboard lower membrane more reliably.

According to the vehicle body front part structure in the above-described (3), it is possible to support the bottom end of the center frame by a tunnel part having a high stiffness. As a result, the stiffness of the center frame can be increased, so that it is possible to suppress the vibration of the dashboard lower membrane even more reliably.

According to the vehicle body front part structure in the above-described (4), it is possible to further increase the stiffness of the whole dashboard lower. Moreover, since a front impact load transmitted from the dashboard cross member is transmitted to the tunnel part via the center frame, it is possible to disperse the front impact load.

According to the vehicle body front part structure in the above-described (5), it is possible to increase the support effect of the center frame with respect to the dashboard lower, by the degree of inclination of the center frame. In addition, since the ridges of the center frame are formed in straight lines, it is possible to further increase the support effect of the center frame with respect to the dashboard lower. Furthermore, since a front impact load is transmitted to the tunnel part via the center frame efficiently, the vehicle body front part structure can disperse the front impact load.

BEST MODE FOR CARRYING OUT THE INVENTION (Vehicle Body Front Part Structure) (Dashboard Lower)

Next is a description of an embodiment of the present invention based on the drawings. In the following description, there are cases in which the front in the direction of travel of a vehicle is simply denoted as "front", rear in the direction of travel is simply "rear", right in the vehicle width direction is simply "right", left in the vehicle width direction is simply "left", up in the gravity direction is simply "up", and down in the gravity direction is simply "down".

Figure 1:
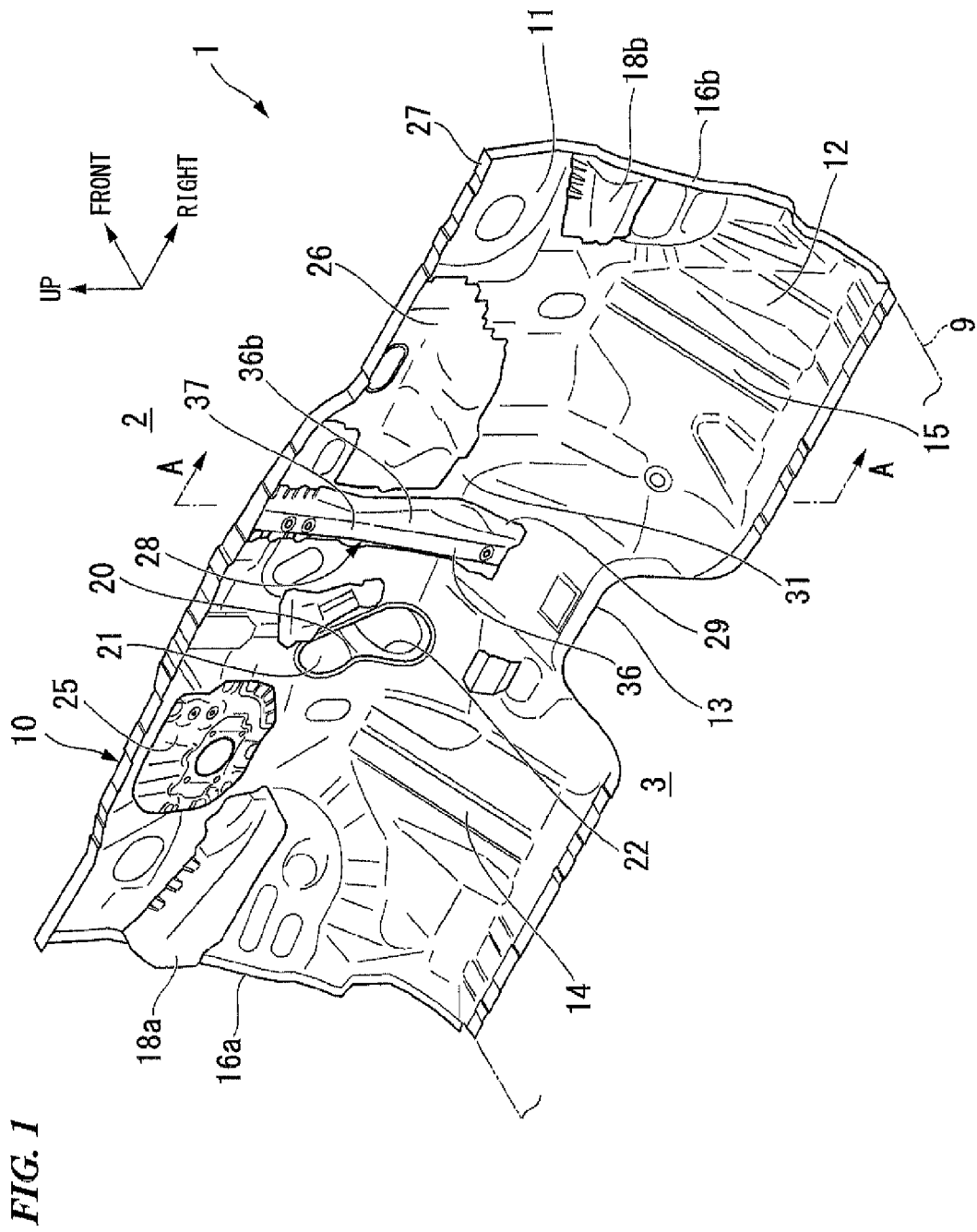
FIG. 1 is a perspective view of a dashboard lower according to an embodiment of the present invention, viewed from the cabin side.
Figure 2:
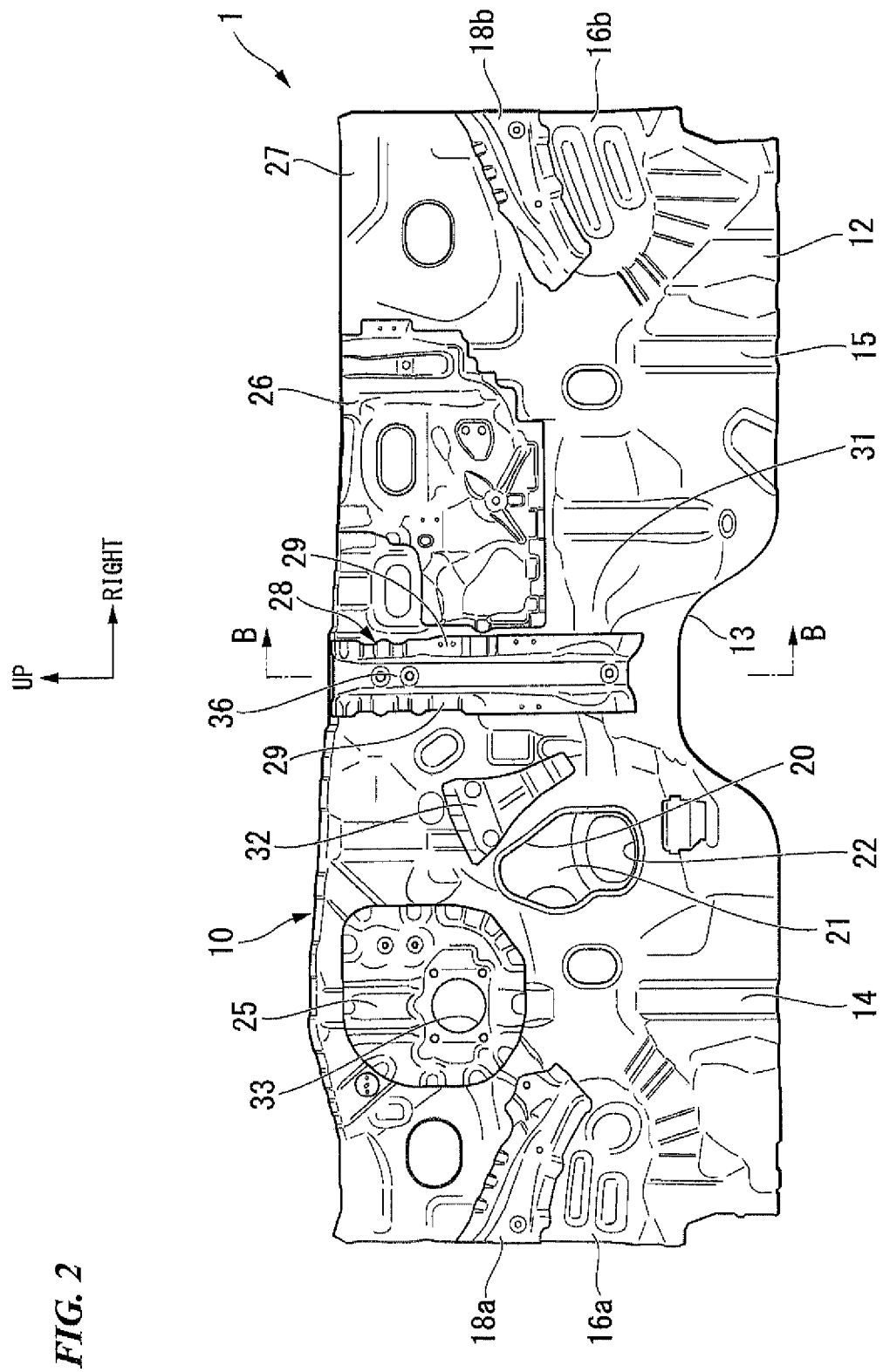
FIG. 2 is a plan view of the dashboard lower according to the embodiment, viewed from the cabin side.
Figure 3:
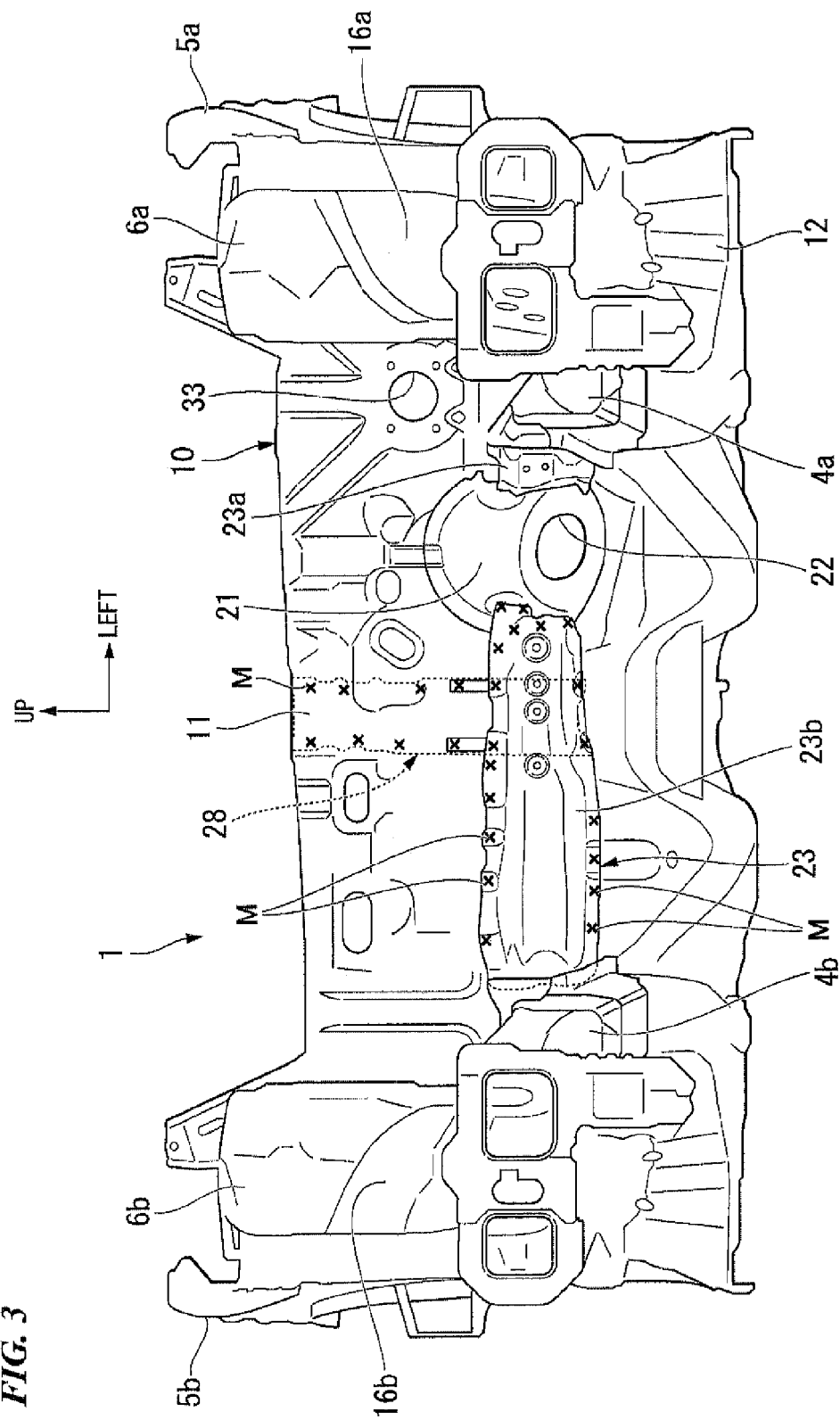
FIG. 3 is a plan view of the dashboard lower according to the embodiment, viewed from the engine compartment side.

FIG. 1 is a perspective view of a dashboard lower viewed from the cabin side, FIG. 2 is a plan view of the dashboard lower viewed from the cabin side, and FIG. 3 is a plan view of the dashboard lower viewed from the engine compartment side.

As shown in FIG. 1 to FIG. 3, a vehicle body front part structure 1 is provided with front side frames 4a and 4b, front pillars 5a and 5b, upper members 6a and 6b, a dashboard lower 10, and a floor panel 9.

The front side frames 4a and 4b are located at the front, forming left and right frame parts of an engine compartment 2. The front pillars 5a and 5b are disposed at the rear of the front side frames 4a and 4b, and on the left and right outside of them, and extend in the vertical direction. The upper members 6a and 6b are disposed above the front side frames 4a and 4b, the front ends of which are joined to the front ends of the front side frames 4a and 4b, and the rear ends are joined to the front pillars 5a and 5b. The dashboard lower 10 separates the engine compartment 2 from a cabin 3 disposed at the rear of this, and is joined to the front side frames 4a and 4b, the front pillars 5a and 5b, and the upper members 6a and 6b. The floor panel 9 is joined to the bottom end of the dashboard lower 10.

The dashboard lower 10 is formed from a pressed sheet metal member, and has a vertical wall (first vertical wall) 11 along the vertical direction, and sloping walls 12 extending in a slope downward to the rear from the lower part of the vertical wall 11. Furthermore, wheel housing parts 16a and 16b are provided on the left and right sides of the dashboard lower 10 respectively.

The wheel housing parts 16a and 16b are both formed so as to protrude toward the cabin 3. Furthermore, gussets 18a and 18b are provided at the tops of the wheel housing parts 16a and 16b respectively.

The rear ends of the front side frames 4a and 4b are joined by spot welding to the ends of the gussets 18a and 18b, respectively, toward the center of the vehicle in the width direction, with the dashboard lower 10 being sandwiched between them. On the other hand, the front pillars 5a and 5b are joined by spot welding to the ends of the gussets 18a and 18b, respectively, toward the outside of the vehicle in the width direction.

As shown in FIG. 1 and FIG. 2A, a tunnel part 13 that protrudes upwards is formed in one piece centered between the sloping walls 12 of the dashboard lower 10 in the vehicle width direction, that is in the lower part of the dashboard lower 10. A step part 14 on the driver's seat side is disposed on the left side, and a step part 15 on the passenger's seat side is disposed on the right side with the tunnel part 13 in between them.

A steering opening part 20, which connects the engine compartment 2 with the cabin 3, is formed at the boundary of the vertical wall 11 and the sloping wall 12 in the driver's seat side step part 14 as shown in FIG. 1. The steering opening part 20 is formed in order for a steering shaft and a universal joint connected to the steering shaft (not shown in the figure) to be inserted therethrough. Moreover, a steering joint cover 21 to cover it is installed in the steering opening part 20 from the engine compartment 2 side.

The steering joint cover 21 is a cup shape formed so as to protrude toward the engine compartment 2 side, and has a joint insertion entry 22 formed in order for the steering shaft and universal joint (not shown in the figure) to be inserted.

Figure 5:
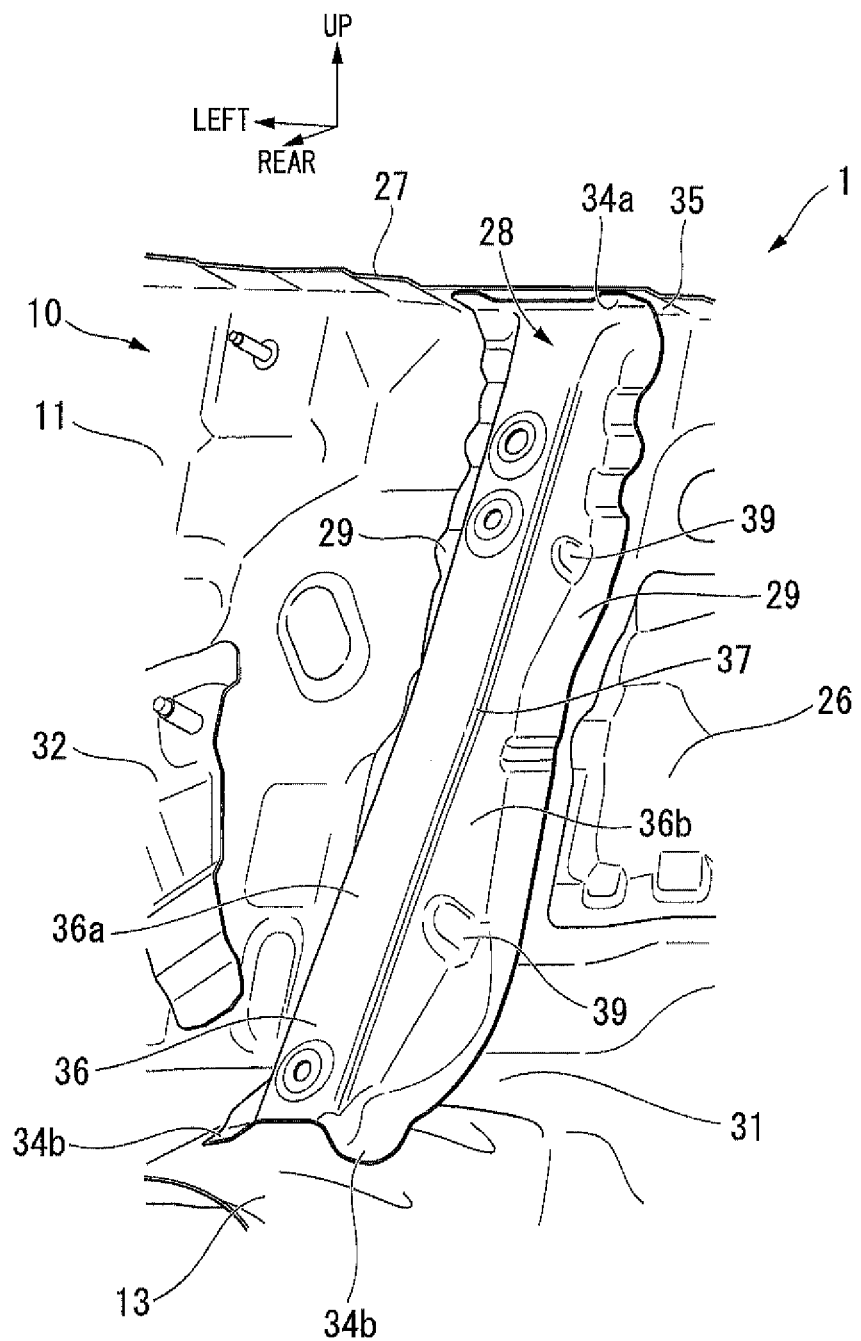
FIG. 5 a perspective view of the center frame according to the embodiment.
Figure 6:
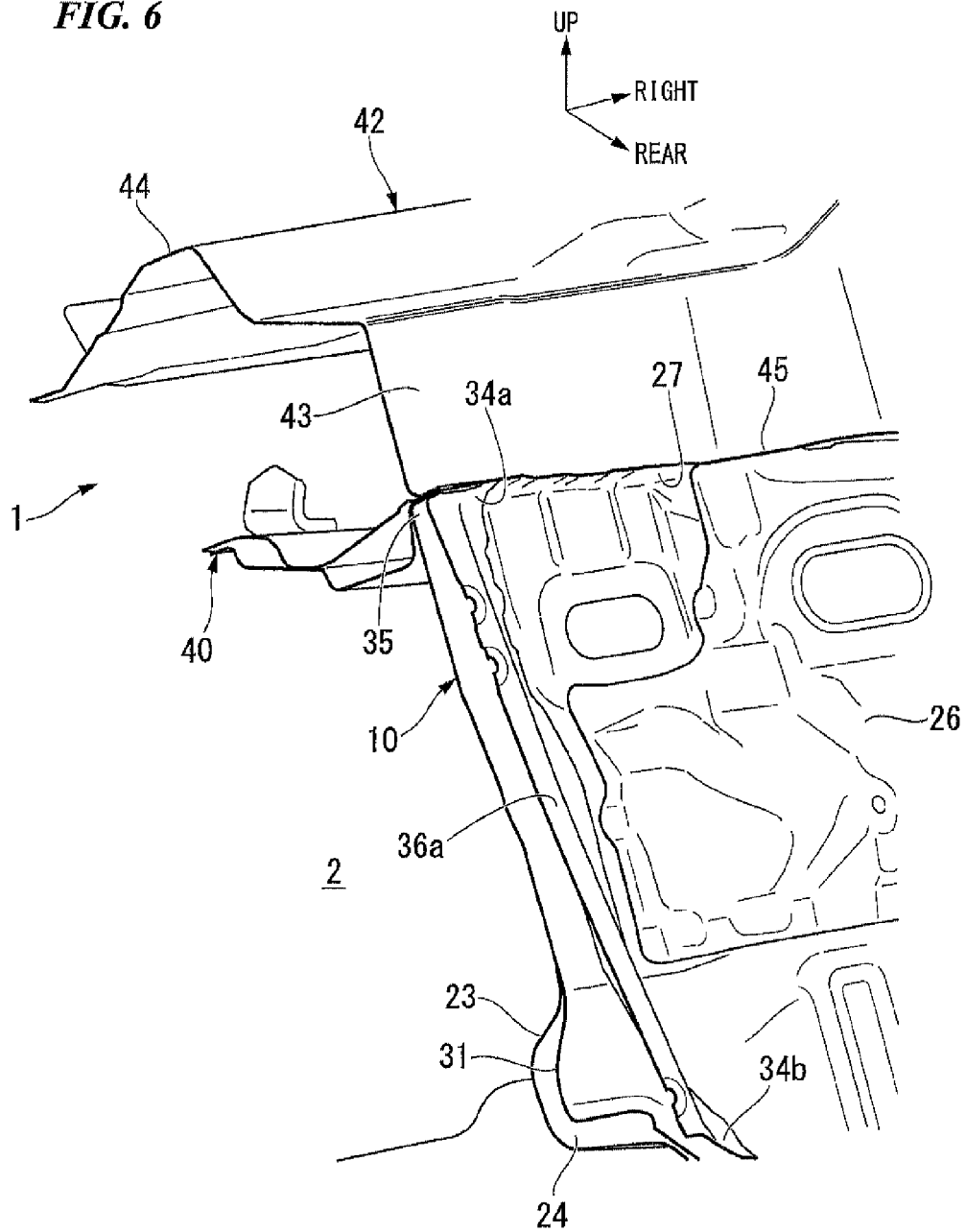
FIG. 6 is a cross-sectional perspective view taken along line A-A of FIG. 1.

Furthermore, a dashboard cross member 23, which extends in the vehicle width direction, that is, along the left and right front side frames 4a and 4b, is provided in a location corresponding to the steering joint cover 21 on the surface of the engine compartment 2 side of the dashboard lower 10. The dashboard cross member 23 increases the stiffness of the dashboard lower 10, and disperses a front impact load. Moreover, the cross-section shape in the case where it is viewed in cross-section perpendicular to the direction of the length of the dashboard cross member 23 is formed in a substantially hat shape. A closed cross-section structure part 24 is formed by joining the open side of the dashboard cross member 23 facing toward the dashboard lower 10 by spot welding (refer to FIG. 5 and FIG. 6). To be specific, as shown in FIG. 6, in the case where it is viewed in a parallel cross-section along the vertical direction, the closed cross-section structure part 24, which is a closed cross-section structure, is formed in the dashboard cross member 23.

Moreover, the dashboard cross member 23 is formed so as to be divided into left and right with the steering joint cover 21 between the parts. That is, the dashboard cross member 23 comprises a left cross member 23a and a right cross member 23b.

One end of each of the left cross member 23a and the right cross member 23b is joined to the steering joint cover 21 by spot welding. That is, the left cross member 23a and the right cross member 23b are connected via the steering joint cover 21. On the other hand, the opposite ends of each of the left cross member 23a and the right cross member 23b are joined to the corresponding left and right front side frames 4a and 4b by spot welding.

A concave part 31 is formed in a location corresponding to the right cross member 23b, on the surface of the cabin 3 side of the dashboard lower 10, so as to be elongated in the left and right direction. The concave part 31 is formed by the dashboard lower 10 protruding toward the engine compartment 2 side. By so doing, it is possible to further increase the stiffness of the region corresponding to the dashboard cross member 23 of the dashboard lower 10.

Furthermore, an accelerator pedal bracket 32 on which an accelerator pedal (not shown in the figure) is mounted, is provided on the surface of the dashboard lower 10 above and to the right of the steering opening part 20 on the cabin 3 side of the vertical wall 11. Moreover, a mounting hole 33 in which a brake master cylinder (not shown in the figure) is mounted, is formed in the vertical wall 11 above and to the left of the steering opening part 20.

A master cylinder stiffener 25 is provided at a location corresponding to the mounting hole 33 on the cabin 3 side of the surface of the vertical wall 11. An unevenness is formed in the master cylinder stiffener 25 by pressing a sheet metal material, and the brake master cylinder (not shown in the figure) is mounted on the unevenness.

Moreover, a damping material fixing panel 26 is provided on the vertical wall 11 above and to the right of the tunnel part 13. The damping material fixing panel 26 affixes a melting sheet (not shown in the figure) attached as a damping material of the dashboard lower 10, and an unevenness is formed in the damping material fixing panel 26 by pressing a sheet metal material.

A bent part 27, which is bent and extends toward the rear, is formed at the top edge of the vertical wall 11. A center frame 28, which extends along the vertical direction of the vehicle, is provided between the bent part 27 of the vertical wall 11 and the tunnel part 13.

(Center Frame)

Figure 4:
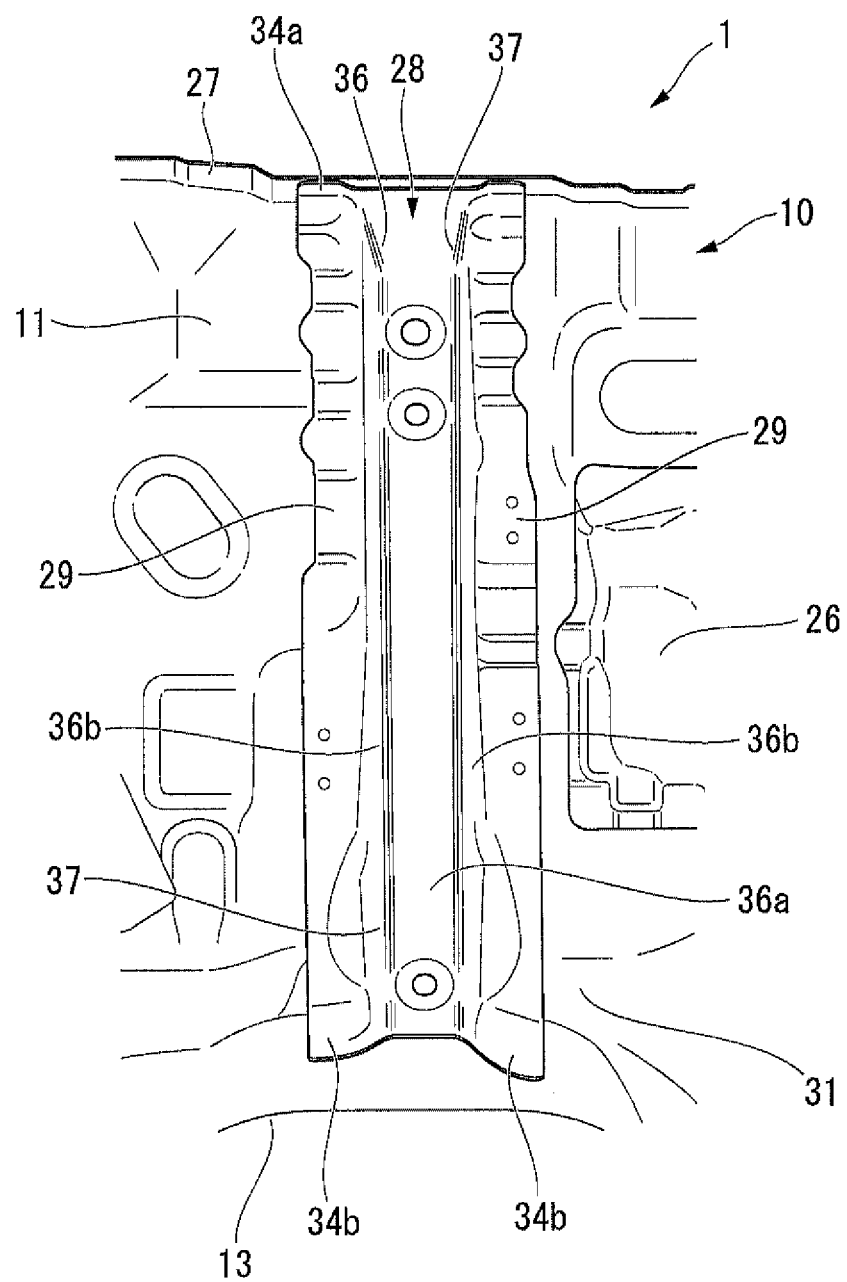
FIG. 4 is a front view of a center frame according to the embodiment.
Figure 7:
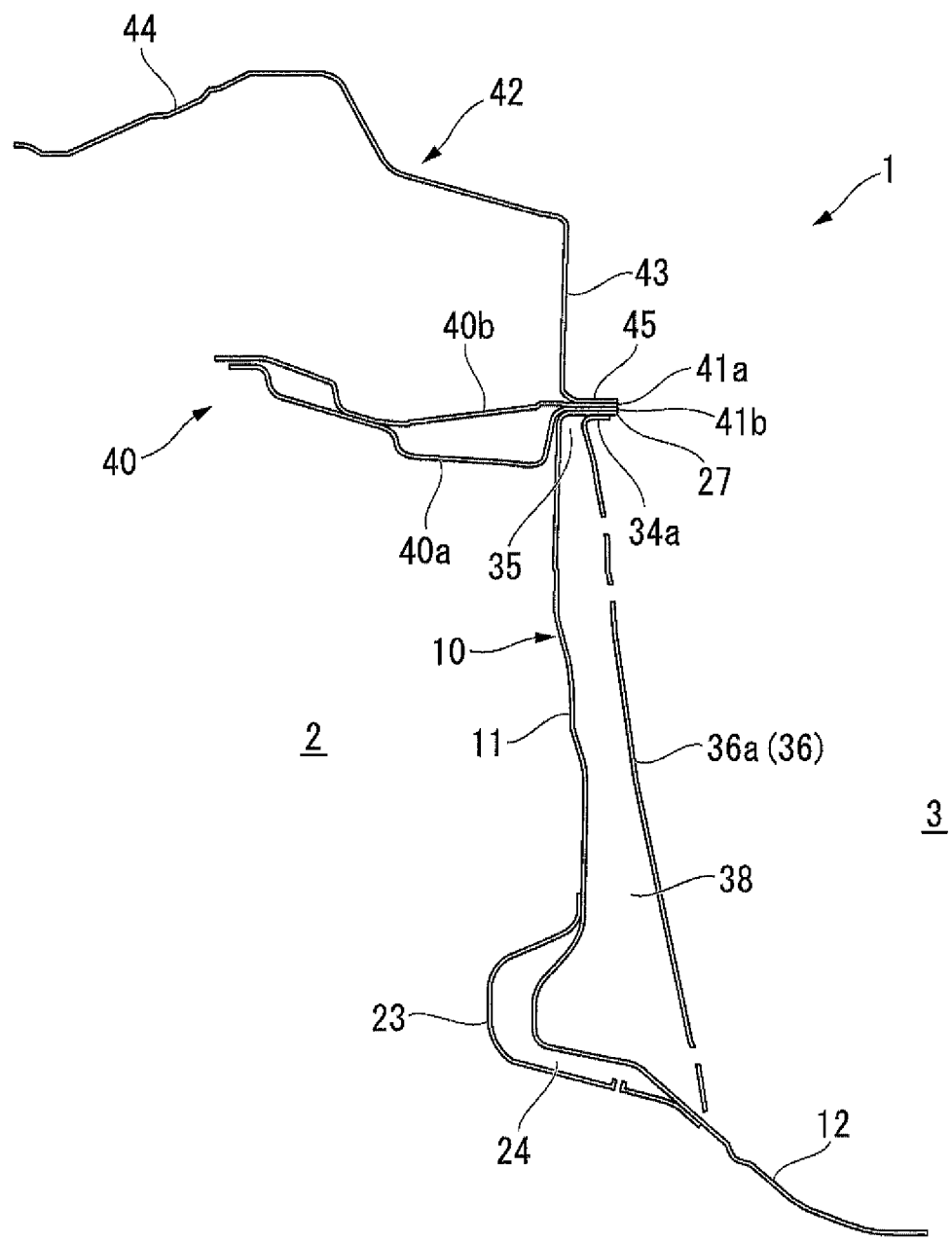
FIG. 7 is a cross-sectional view taken along line B-B of FIG. 2.

FIG. 4 is a front view of the center frame. FIG. 5 is a perspective view of the center frame. FIG. 6 is a cross-sectional perspective view taken along line A-A of FIG. 1. FIG. 7 is a cross-sectional view taken along line B-B of FIG. 2.

As shown in FIG. 4 to FIG. 7, a cross-sectional shape, in the case where it is viewed in cross-section perpendicular to the direction of the length of the center frame 28, is formed in a substantially hat shape, and it is formed so as to span the bent part 27 of the vertical wall 11 and the tunnel part 13. That is, the center frame 28 is configured of a frame body 36 formed in a substantially U shape in cross-section, and flange parts 29 that bend and extend toward the outside from the two side edges of the frame body 36.

The center frame 28 has a pair of side walls 36b facing each other, and a base wall 36a that connects the pair of side walls 36b.

The frame body 36 is disposed such that its open side faces the vertical wall 11 side, and the bottom wall 36a of the frame body 36 slopes down toward the rear. Furthermore, the height of the side walls 36b of the frame body 36 is set such that it gradually becomes higher as it proceeds downward so as to correspond to the downward slope of the bottom wall 36a, and it follows the unevenness of the vertical wall 11.

As a result, the center frame 28 slopes down toward the rear, while the flange parts 29 overlap the vertical wall 11. Moreover, a ridge part (ridgeline) 37, which is a connecting portion of the bottom wall 36a and the side wall 36b, is formed in a straight line.

Furthermore, a plurality of weld bead parts 39 is formed on the left and right side walls 36b and 36b and the flange parts 29. The stiffness of the center frame 28 is increased by the plurality of weld bead parts 39. The flange parts 29 formed in this manner are joined by spot welding in a state in which they overlap the vertical wall 11, and a closed cross-section structure part 38 is formed between the vertical wall 11 and center frame 28.

Moreover, top end flange parts 34a, which are bent and extend toward the rear such that they overlap the bent parts 27 of the vertical wall 11, are formed at the top end of the center frame 28. The top end flange parts 34a and the bent parts 27 overlap each other, and are joined by spot welding. In this manner, a closed cross-section structure part 35 is formed between the center frame 28 and the bent parts 27.

On the other hand, bottom end flange parts 34b, which extend so as to follow the top surface of the tunnel part 13, are formed at the bottom ends of the flange parts 29. The bottom end flange parts 34b and the top surface of the tunnel part 13 are overlapped and joined by spot welding.

As shown in FIG. 3, the arrangement is such that areas of the flange parts 29 that correspond to the region of the dashboard cross member 23 are exposed on the engine compartment 2 side of the dashboard lower 10. The areas exposed are joined to the dashboard cross member 23 by spot welding.

Reference sign M shown in FIG. 3 denotes spot welds between the dashboard lower 10 and each of the steering joint cover 21, the dashboard cross member 23, the master cylinder stiffener 25, the damping material fixed panel 26, and the center frame 28.

Furthermore, as shown in FIG. 7, the bent part 27 of the dashboard lower 10 is joined to a dashboard upper assembly 40 by spot welding. The dashboard upper assembly 40 has a lower panel 40a and an upper panel 40b, which are formed by pressing sheet metal material, and is constructed by stacking the lower panel 40a and the upper panel 40b on top of each other. Moreover, a closed cross-section structure is formed by the lower panel 40a and the upper panel 40b.

A flange part 41a is formed on the rims of the upper panel 40b and a flange part 41b is formed on the rims of the lower panel 40a. The dashboard upper assembly 40 is formed by spot welding the stacked flange part 41a and flange part 41b. Then, the bent part 27 of the dashboard lower 10 is joined to the flange part 41 by spot welding.

Moreover, a front glass support panel 42 is formed by pressing a sheet metal material, and has a vertical wall (second vertical wall) 43 and an extended part 44. The bent part 27 of the dashboard lower 10 is connected to the vertical wall 43 of the front glass support panel 42 with the dashboard upper assembly 40 between them.

The vertical wall 43 is formed on the same plane as the vertical wall 11 of the dashboard lower 10. The extended part 44 is bent and extends toward the front from the top edge of the vertical wall 43.

A flange part 45, which is bent and extends toward the rear, is formed at the bottom edge of the vertical wall 43, and the bent part 27 of the dashboard lower 10 is joined to the flange part 45 by spot welding with the dashboard upper assembly 40 between them.

(Effects)

Therefore, according to the above-described embodiment, since a closed cross-section structure part 35 is formed between the bent part 27 and the center frame 28 by joining the top end flange part 34a of the center frame 28 to the bent part 27 formed at the top edge part of the dashboard lower 10 (refer to FIG. 7), it is possible to increase the stiffness of the bent part 27 effectively. As a result, it is possible to effectively suppress the membrane vibration, with the bent part 27 of the dashboard lower 10 being the start point, when a vehicle is moving, for example.

Furthermore, the bent part 27 of the dashboard lower 10 is joined to the front glass support panel 42 with the dashboard upper assembly 40 between them. That is, the flange part 45 is formed on the vertical wall 43 of the front glass support panel 42 having a high stiffness. The stiffness of the bent part 27 can be further increased by joining the bent part 27 of the dashboard lower 10 to the flange part 45. As a result, it is possible to suppress the membrane vibration of the dashboard lower 10 more reliably.

Moreover, the bottom end flange part 34b, which extends so as to follow the top surface of the tunnel part 13, is formed at the bottom end of the flange part 29, and the bottom end flange part 34b is joined to the top surface of the tunnel part 13 by spot welding. That is, the bottom end of the center frame 28 is supported by the tunnel part 13 having a high stiffness. As a result, the stiffness of the center frame 28 can be increased, so it is possible to suppress the membrane vibration of the dashboard lower 10 even more reliably.

The flange parts 29 of the center frame 28 are arranged such that areas corresponding to the region of the dashboard cross member 23 are exposed on the engine compartment 2 side. The areas exposed are joined to the dashboard cross member 23 by spot welding. As a result, since the dashboard cross member 23 and the center frame 28 are unified to support the dashboard lower 10, the stiffness of the whole dashboard lower 10 is further increased. Furthermore, since a front impact load transmitted from the dashboard cross member 23 is transmitted to the tunnel part 13 via the center frame 28, the vehicle body front part structure 1 can disperse the load.

Moreover, the bottom wall 36a of the frame body 36 of the center frame 28 is disposed such that it slopes down toward the rear, and furthermore, the ridge parts 37 between the bottom wall 36a and the side walls 36b, which configures the frame body 36, are formed in straight lines. In this manner, it is possible to increase the support effect of the center frame 28 with respect to the dashboard lower 10 reliably by the degree of inclination of the center frame 28. Moreover, it is possible to transmit a front impact load transmitted from the dashboard cross member 23 to the tunnel part 13 via the center frame 28 efficiently.

The left and right front side frames 4a and 4b are joined to the end parts on the central side in the vehicle width direction of the left and right gussets 18 and 19 respectively. On the other hand, the left and right front pillars 5a and 5b are joined to the end parts on the outside in the vehicle width direction (refer to FIG. 1 and FIG. 3). As a result, since a front impact load transmitted from the left front side frame 4a on the left side is transmitted to the front pillar 5a on the left side via the gusset 18a on the left side, the vehicle body front part structure 1 can disperse the load. Furthermore, since the front impact load transmitted from the right front side frame 4b on the right side is transmitted to the front pillar 5b on the right side via the gusset 18b on the right side, the vehicle body front part structure 1 can disperse the load.

The present invention is not limited to the above-described embodiment. It includes a range of changes and modifications to the above-described embodiment provided they do not depart from the gist of the present invention.

For example, the above-described embodiment is described using a construction in which the lower panel 40a and the upper panel 40b are overlapped as a dashboard upper assembly 40 to which the bent part 27 of the dashboard lower 10 is connected. However, this is not a limitation, and a dashboard assembly constructed using only sheet metal material may be used instead of the dashboard upper assembly 40.

Moreover, in the above-described embodiment, a case is described in which metal joins of each part are achieved by spot welding. However, this is not a limitation, and it is possible to use appropriate conventionally known metal welding methods such as TIG (tungsten inert gas) welding, MIG (metal inert gas) welding, arc welding such as plasma arc welding, laser welding, electron beam welding, and the like.

BRIEF DESCRIPTION OF THE REFERENCE SYMBOLS

1 Vehicle body front part structure
10 Dashboard lower
11, 43 Vertical wall
13 Tunnel part
23 Dashboard cross member
27 Bent part
28 Center frame
34a Top end flange part
34b Bottom end flange part
37 Ridge part (ridgeline)
42 Front glass support panel

The invention claimed is:

1. A vehicle body front part structure comprising:
a center frame which extends along a vertical direction of a vehicle, a top end flange part provided on a top end of the center frame and bending from the top end of the center frame toward a rearward direction of the vehicle; and a dashboard lower which separates a vehicle engine compartment from a vehicle cabin, the dashboard lower having a first vertical wall, the first vertical wall having a first surface facing the vehicle engine compartment and a second surface facing the vehicle cabin and the rearward direction of the vehicle, the first surface and the second surface of the first vertical wall oriented to extend in a vertical direction of the vehicle, the dashboard lower having a bent part provided on a top edge of the first vertical wall, the bent part bending from the top edge of the first vertical wall toward the rearward direction of the vehicle,
wherein
the top end flange part overlaps and connects to the bent part, a closed cross-section structure part is defined between the center frame and the bent part, and the center frame is disposed on the second surface of the first vertical wall.

2. The vehicle body front part structure according to claim 1, further comprising
a front glass support panel having a second vertical wall that is co-planar with the first vertical wall, wherein
the second vertical wall of the front glass support panel connects to the bent part of the dashboard lower.

3. The vehicle body front part structure according to claim 1, wherein:
a bottom end flange part is provided at a bottom end of the center frame;
a tunnel part is provided in a center of a bottom of the dashboard lower in a width direction of the vehicle; and
the bottom end flange part connects to the tunnel part.

4. The vehicle body front part structure according to claim 3, further comprising
a dashboard cross member which is provided with the dashboard lower and extends along the vehicle width direction, wherein
the dashboard cross member connects to the center frame.

5. The vehicle body front part structure according to claim 3, wherein
the center frame has a pair of side walls facing each other and a bottom wall which joins bottom ends of the pair of side walls to each other, and is disposed in a descending slope toward the rearward direction of the vehicle; and a ridge of the center frame, which is a connecting portion of the pair of side walls and the bottom wall, defines a straight line.

6. The vehicle body front part structure according to claim 1, wherein:

the center frame has a pair of side walls that face each other and a base wall that connects the pair of side walls;

a first closed cross-section structure part is defined between the center frame and the dashboard lower;

a second closed cross-section structure part is defined between the top end flange part and the dashboard lower; and the first closed cross-section structure part connects to the second closed cross-section structure part.

7. The vehicle body front part structure according to claim 1, further comprising:

a dashboard upper assembly connected to the top edge of the dashboard lower, the dashboard upper assembly extending in a forward direction of the vehicle from the dashboard lower.

8. The vehicle body front part structure according to claim 7, wherein the dashboard upper assembly includes a dashboard upper flange part which connects to the top end flange part of the center frame and the bent part of the dashboard lower.

9. The vehicle body front part structure according to claim 8, wherein an upper surface of the top end flange part of the center frame directly abuts a lower surface of the dashboard upper flange part, and an upper surface of the dashboard upper flange part directly abuts a lower surface of bent part of the dashboard lower.

10. The vehicle body front part structure according to claim 1, wherein the center frame and the top end flange part are integrated with each other as a unitary piece, and the dashboard lower and the bent part are integrated with each other as a unitary piece.

* * * * *